United States Patent
Raj et al.

(10) Patent No.: US 10,616,175 B2
(45) Date of Patent: Apr. 7, 2020

(54) FORWARDING INFORMATION TO FORWARD DATA TO PROXY DEVICES

(71) Applicant: HEWLETT PACKARD ENTERPRISE DEVELOPMENT LP, Houston, TX (US)

(72) Inventors: Anil Raj, Karnataka (IN); Prasanth Gopinathan Nair Saraswathy Amma, Karnataka (IN); Venkatavaradhan Devarajan, Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 28 days.

(21) Appl. No.: 15/967,851

(22) Filed: May 1, 2018

(65) Prior Publication Data
US 2019/0342258 A1 Nov. 7, 2019

(51) Int. Cl.
H04L 29/12 (2006.01)
H04L 12/18 (2006.01)
H04L 29/08 (2006.01)
H04L 12/741 (2013.01)
H04L 12/801 (2013.01)

(52) U.S. Cl.
CPC .......... *H04L 61/103* (2013.01); *H04L 45/745* (2013.01); *H04L 47/17* (2013.01); *H04L 61/2007* (2013.01); *H04L 67/28* (2013.01); *H04L 69/324* (2013.01); *H04L 69/325* (2013.01)

(58) Field of Classification Search
CPC ... H04L 61/103; H04L 47/17; H04L 61/2007; H04L 45/745; H04L 67/28; H04L 69/325; H04L 69/324
See application file for complete search history.

(56) References Cited

U.S. PATENT DOCUMENTS

| 7,903,650 B2 | 3/2011 | Zhao et al. |
| 9,148,374 B2 | 9/2015 | Li |
| 9,426,060 B2 | 8/2016 | Dixon et al. |
| 2015/0043576 A1* | 2/2015 | Dixon .................. H04L 12/184 370/390 |

(Continued)

OTHER PUBLICATIONS

Ethernuno, CCNP Switch 300-115—Part 3 Infrastructure Services—FHRP, (Web Page), Jan. 20, 2016, 191 Pgs.

(Continued)

*Primary Examiner* — Kiet Tang
(74) *Attorney, Agent, or Firm* — Park, Vaughan, Fleming & Dowler LLP (57) ABSTRACT

In some examples, a switch includes a first communication interface to communicate with a first device, a second communication interface to communicate with a proxy device enabled to perform proxy address resolution, and a processor to receive a first data packet from the first device targeted to a first layer 3 network address, send, to the proxy device, an address resolution request to obtain a layer 2 network address corresponding to the first layer 3 network address, and responsive to receiving a response to the address resolution request, update a forwarding information structure to refer to a layer 3 network address of the proxy device, the forwarding information structure useable to forward a second data packet to the proxy device for transmission of the second data packet to a destination device.

18 Claims, 5 Drawing Sheets

(56) References Cited

U.S. PATENT DOCUMENTS

2015/0098475 A1    4/2015  Jayanarayana et al.

OTHER PUBLICATIONS

Plummer, Network Working Group, Request for Comments: 826, An Ethernet Address Resolution Protocol-or-Converting Network Protocol Addresses to 48.bit Ethernet Address for Transmission on Ethernet Hardware, Nov. 1982 (10 pages).
Rouse: Margaret, What is ternary content-addressable memory (TCAM)?—Definition from WhatIs.com dated on or before Apr. 9, 2018 (3 pages).
Trotter, Network Working Group, Request for Comments: 3222, Category: Informational Terminology for Forwarding Information Base (FIB) based Router Performance, Dec. 2001 (15 pages).
Wikipedia, Address Resolution Protocol last edited Mar. 17, 2018 (5 pages).
Wikipedia, Content-addressable memory last edited Apr. 7, 2018 (3 pages).
Wikipedia, Forwarding information base last edited Aug. 14, 2017 (3 pages).
Wikipedia, Longest prefix match last edited Jun. 22, 2017 (1 page).
Wikipedia, Proxy ARP last edited Mar. 30, 2018 (2 pages).

* cited by examiner

FORWARDING INFORMATION TO FORWARD DATA TO PROXY DEVICES

BACKGROUND

Devices can communicate over a network. Devices on a network are associated with network addresses that can be used to direct data packets between the devices over the network.

Communications over a network can employ different layers of network addresses. For example, layer 3 network addresses and layer 2 network addresses can be used. An example of a layer 3 network address is an Internet Protocol (IP) address. An example of a layer 2 network address is a Medium Access Control (MAC) address.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the ensuing discussion, reference is made to examples in which Internet Protocol (IP) addresses and Medium Access Control (MAC) addresses are used. However, in other examples, other types of layer 3 network addresses and/or layer 2 network addresses can be employed. Layers 2 and 3 can refer to corresponding layers of an Open Systems Interconnection (OSI) model. In the OSI model, layer 2 is a data link layer, and layer 3 is a network layer.

An Address Resolution Protocol (ARP) is a communication protocol used to discover a layer 2 network address (e.g., a MAC address) associated with a layer 3 network address, such as an IP address (e.g., version 4 (IPv4) address, IP version 6 (IPv6) address, etc.). To send a data packet to an IP address, a sender device can use ARP to determine the corresponding MAC address, to which the device can send the packet for delivery to a destination. More specifically, the sender device can send an ARP request containing the IP address of the destination, which can be broadcasted to multiple devices. One of the devices receiving the ARP request can respond with an ARP response that contains the MAC address corresponding to the broadcasted IP address. The sender device then sends the data packet to the MAC address contained in the ARP response.

Proxy ARP refers to a technique where a device (referred to as an "ARP proxy device") is able to respond to an ARP request on behalf of a destination device. The ARP proxy device is aware of a location of the destination device associated with an IP address contained in the ARP request. With proxy ARP, instead of responding to the ARP request with the MAC address of the destination device, the ARP proxy device instead responds to the ARP request with the MAC address of the ARP proxy device. A sender device sends a data packet (targeted to the destination device) to the MAC address of the ARP proxy device, which in turn forwards the data packet to the destination device.

In some example arrangements, a network switch (or more simply, a "switch") can send ARP requests on behalf of other devices (referred to as "host devices") that may send data packets to destination devices. The host devices are connected to the switch and are part of a first network. In turn, the network switch is connected to an ARP proxy device on which ARP is enabled. When the host devices have data packets to send to the destination devices on a second network that is separate from the first network, the switch may send ARP requests to the ARP proxy device to resolve MAC addresses for IP addresses to which the data packets are targeted.

In response to each ARP request, the ARP proxy device returns an ARP response that contains the MAC address of the ARP proxy device. As each ARP response is received by the switch, the switch can add respective entries to an ARP table. The ARP table includes address resolution information that maps IP addresses to MAC addresses (or more generally, that maps layer 3 network addresses to layer 2 network addresses). If there are a large number of host devices that can send a large number of data packets to destination devices, then the number of entries added to the ARP table can be quite large.

For high-speed operation of the switch, the ARP table can be kept in a high-speed memory in the switch. An example of a high-speed memory is a ternary content-addressable memory (TCAM), which can be implemented in hardware, such as in a programmable integrated circuit device, a programmable gate array, a microprocessor, a microcontroller, or another hardware processing circuit. A TCAM is able to search content stored in the TCAM based on search inputs that can contain any of three states: 0, 1, and X. The X state is a "don't care" or "wildcard" state to allow the TCAM to perform a broader search based on pattern matching (as opposed to exact matching).

In other examples, the ARP table can be stored in a different type of memory.

The high-speed memory of a switch may have relatively small storage capacity. As a result, the high-speed memory may not be able to efficiently support an ARP table with a large number of entries.

Examples disclosed herein address these technical issues by providing a way to limit the amount of entries in an ARP table. In some examples, examples disclosed herein discuss, instead of adding entries to an ARP table as host devices send data packets to additional IP addresses, for any given route (e.g., an IP route) from the switch, just one ARP request is sent. Once the ARP proxy device responds with an ARP response to the ARP request, the switch is able to identify the presence of the ARP proxy device. The switch adds an entry to the ARP table based on the information in the ARP response. However, any subsequent data packets sent by host devices to various IP addresses that map to the given route would not trigger additional ARP requests to the ARP proxy device, which in turn means that the switch would not add entries to the ARP table for the subsequent data packets.

In response to the ARP response, the switch updates a forwarding information structure (e.g., a Forwarding Information Base or FIB table, etc.) with an entry that associates the given route to a next-hop address. The forwarding information structure is used by the switch to forward any data packets targeting IP addresses mapped to the given route to the next-hop address. The next-hop address maintained by the forwarding information structure can be the IP address of the ARP proxy device.

Although reference is made to ARP and proxy ARP in some examples, in other examples, other address resolution protocols can be employed that obtain a network address at one layer for a network address at another layer.

Figure 1:
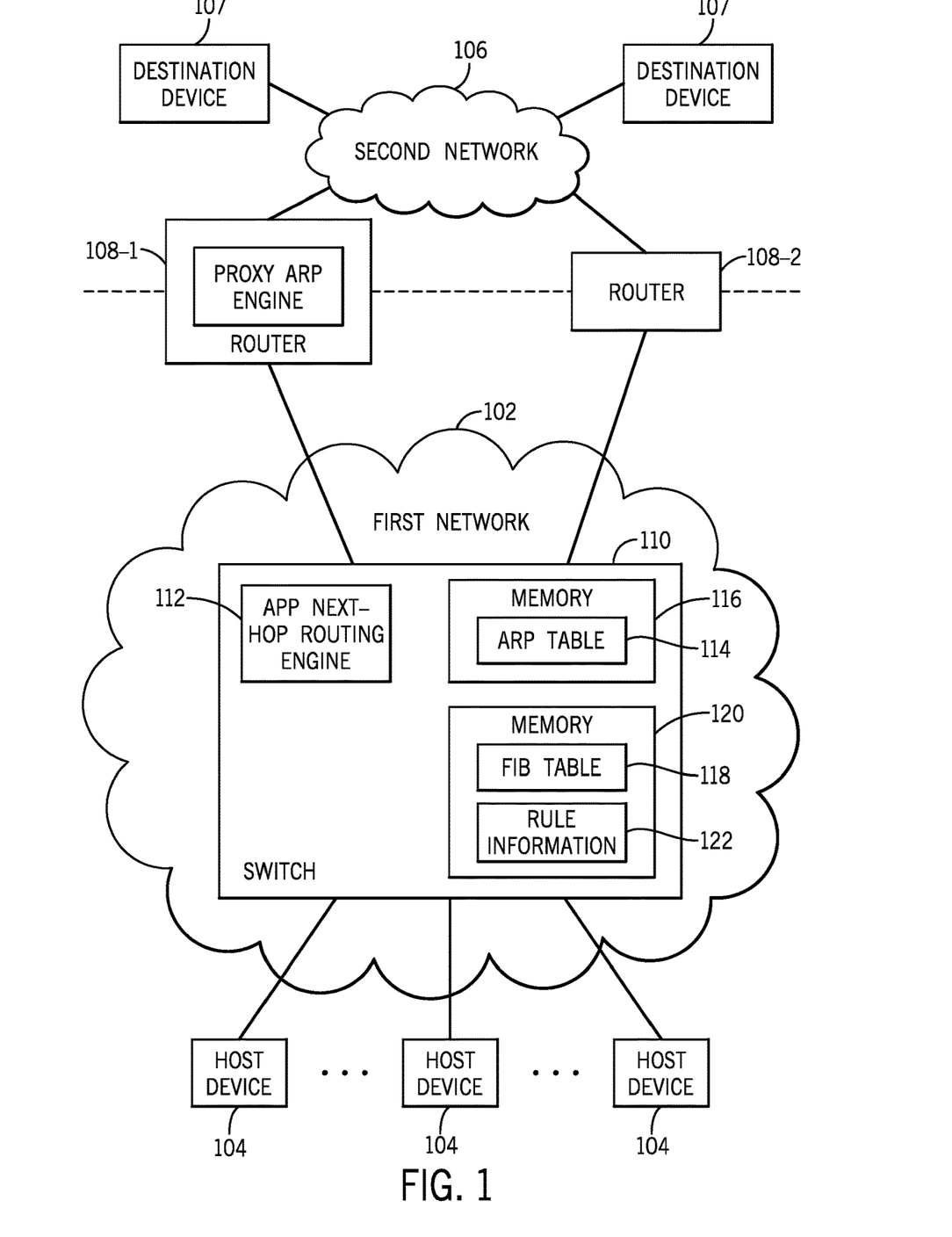
FIG. 1 is a block diagram of a network arrangement that includes a switch and a proxy Address Resolution Protocol (ARP) enabled device, according to some examples.

FIG. 1 is a block diagram of an example network arrangement that includes a first network 102 to which various host devices 104 are connected. Examples of the host devices 104 include a desktop computer, a notebook computer, a tablet computer, a smart phone, a communication node (e.g., a wireless access point to which wireless devices are able to establish wireless connectivity), a storage server, an application server, a database server, a web server, a game appliance, a vehicle, and so forth.

The first network 102 is different and separate from a second network 106. Examples of the first network 102 include a local area network, a wide area network, a home network, a public network (e.g., the Internet), and so forth. In some examples, the first network 102 can be a local network of an enterprise. An enterprise can refer to a company, a government agency, an educational organization, an individual, or any other entity. The second network 106 can be a remote network, such as a public network (e.g., the Internet). In other examples, the second network can be a wide area network, a local area network, a home network, and so forth.

As further shown in FIG. 1, routers 108 are connected to both the first network 102 and the second network 106. Although two routers 108 are shown, it is noted that in other examples, more than two routers 108 or just one router 108 can be provided between the first network 102 and the second network 106.

The routers 108 can be considered to be at a border between the first and second networks 102 and 106. Generally, a router routes data packets based on layer 3 network addresses (e.g., IP addresses) contained in the data packets. A "border" between networks can refer generally to any infrastructure (in the form of equipment such as a router, a gateway, or any other type of device) that maintains either logical or physical separation between two different networks.

In further examples, there can be more than two networks, including, for example, a third network to which the first network 102 can be coupled through a router (or multiple routers).

In some examples, either or both of the router 108-1 and 108-2 is (are) proxy ARP enabled. In the example shown in FIG. 1, the router 108-1 includes a proxy ARP engine 109, which is able to perform proxy ARP related tasks. For example, the proxy ARP engine 109 can receive an ARP request, and can respond to the ARP request according to proxy ARP. The router 108-2 can similarly include a proxy ARP engine. In other examples, the router 108-2 is not proxy ARP enabled and thus does not include a proxy ARP engine.

As used here, an "engine" can refer to a hardware processing circuit, which can include any or some combination of a microprocessor, a core of a multi-core microprocessor, a microcontroller, a programmable integrated circuit device, a programmable gate array, or any other hardware processing circuit. In other examples, an "engine" can refer to a combination of a hardware processing circuit and machine-readable instructions (e.g., software and/or firmware) executable on the hardware processing circuit.

Although reference is made to the router 108-1 and/or 108-2 as being proxy ARP enabled, it is noted that other types of the network devices can also be proxy ARP enabled, i.e., such devices can include proxy ARP engines. More generally, a device that is proxy ARP enabled is referred to as an ARP proxy device, with the router 108-1 or 108-2 being an example of such an ARP proxy device.

The first network 102 includes a switch 110, which is connected to the host devices 104. Although just one switch 110 is shown in FIG. 1, in other examples, the first network 102 can include multiple switches. A switch refers to a network device that forwards data packets along respective paths. The forwarding of data packets by the switch can be based on a MAC address, which in the case of proxy ARP is the MAC address of the ARP proxy device (e.g., the router 108-1 or 108-2).

In accordance with some implementations of the present disclosure, the switch 110 includes an ARP proxy next hop routing engine 112 that is able to route multiple data packets (targeted to respective IP addresses) from a host device 104 (or from multiple the host devices 104) to an ARP proxy device while maintaining a number (one or more than one) of entries in the ARP table 114. The number maintained is less than the number of distinct IP addresses in the multiple data packets data packets routed by the switch 110.

The ARP table 114 is stored in a memory 116 of the switch 110. In some examples, the memory 116 that stores the ARP table 114 is a high-speed memory, such as a TCAM. In other examples, the memory 116 can be implemented with a different type of memory.

The switch 110 further stores an FIB table 118 in a memory 120. The memory 120 can be the same as the memory 116, or alternatively, can be separate from the memory 116.

The ARP table 114 includes entries each mapping an IP address (or more generally, a layer 3 network address) to a respective MAC address (or more generally, a layer 2 network address). As used here, a layer 3 network address that is mapped to a respective MAC address by the ARP table 114 can be the full layer 3 network address or a prefix of the layer 3 network address (where a prefix includes the first number of bits of the layer 3 network address). In the context of proxy ARP, the MAC address to which the IP address is mapped by an entry of the ARP table 114 can be the MAC address of an ARP proxy device, such as the router 108-1 of FIG. 1.

In response to receiving a data packet from host device 104 that contains a given destination IP address, the switch 110 looks up the ARP table 114 to determine whether the ARP table 114 contains an entry for the given destination IP address. Based on a determination that there is an entry, the switch 110 retrieves the MAC address corresponding to the given destination IP address from the entry, and forwards the data packet to the retrieved MAC address (which can be the MAC address of an ARP proxy device such as the router 108-1 or 108-2).

However, even based on the determination that the ARP table 114 does not contain an entry for the given destination IP address, the switch 110 can nevertheless route the data packet to the ARP proxy device based on the FIB table 118 (explained further below). In other words, according to some implementations of the present disclosure, the FIB table 118 allows for a data packet (targeted to the given destination IP address) to be forwarded to the ARP proxy device even though the ARP table 114 does not contain an entry for the given destination IP address.

Rather than adding new entries to the ARP table 114 as data packets are received by the switch 110 from the host devices 104 for transmission to distinct IP addresses (of respective destination devices 107) on the second network 106, the ARP proxy next-hop routing engine 112 can instead add just one entry to the ARP table 114 even though host devices 104 are sending data packets to multiple distinct destination IP addresses. In this manner, the number of entries that have to be added to the ARP table 114 for forwarding data packets to distinct IP addresses on the second network 106 by the switch 110 is reduced from traditional techniques where a respective entry is added to the ARP table 114 whenever a data packet is to be routed to a new distinct IP address on the second network 106. As a result, more efficient usage of the ARP table 114 stored in the memory 116 can be achieved.

To allow the ARP proxy next-hop routing engine 112 to avoid adding multiple entries to the ARP table 114 in response to multiple data packets sent by host devices 104 to distinct destination IP addresses on the second network 106, the ARP proxy next-hop routing engine 112 adds an entry to the FIB table 118. Generally, the FIB table 118 associates a given route to a next-hop address. The given route can be an IP route, such as a static IP route configured by a network administrator of the first network 102. The static IP route can be configured to be provided over a specific path, such as over a path between the switch 110 and the router 108-1. For example, the switch 110 can have multiple communication interfaces, where one of the communication interfaces is connected to an interface of the router 108-1. The network administrator can configure a specific IP route over the path that connects the communication interface of the switch 110 and the corresponding interface of the router 108-1.

An IP route is represented by an IP route address, such as 20.0.0.0/10. An entry of the FIB table 118 can associate the specific IP route (as represented by the IP route address) with the next-hop address of the ARP proxy device, which in the example of FIG. 1 is the router 108-1. In some examples, the next-hop address of the router 108-1 is the IP address of the router 108-1. More generally, the next-hop address of an ARP proxy device can be a layer 3 network address.

The switch 110 can include rule information 122 including a rule that specifies which IP addresses are mapped to a respective IP route. The rule information 122 can be stored in the memory 120 (or a different memory). For example, if only one IP route is configured on the switch 110, then the rule information 122 can specify that all destination IP addresses of data packets sent by the host devices 104 would be provided over this single IP route. In other examples, there can be multiple IP routes configured on the switch 110, where the multiple IP routes can be defined in one or multiple paths between the switch 110 and respective one or multiple routers. In such cases, the FIB table 118 can include entries that associate the multiple IP routes (or more specifically, the multiple IP route addresses representing these IP routes) with respective next-hop address(es) representing respective ARP proxy device(s).

In some examples, the rule information 122 includes an IP route entry programmed into the FIB table 118. The IP route entry programmed into the FIB table includes an IP route address of an IP route. The presence of this FIB table entry is part of the rule that matches destination IP addresses to a corresponding IP route. In some examples, the switch 110 matches a destination IP address of a packet to an entry present in the FIB table using a longest prefix match lookup. For example, if the FIB table 118 has an IP route entry 10.1.1.0/24, then packets destined to 10.1.1.1, 10.1.1.2, etc. will match to 10.1.1.0/24 according to a longest prefix match (i.e., the prefix "10.1.1" in the example destination IP addresses 10.1.1.1, 10.1.1.2 match the prefix of the IP route entry 10.1.1.0/24 in the FIB table 118). A longest prefix match can refer to a technique that attempts to match the longest prefix (the first number of bits) of the destination IP address to a corresponding IP route entry in the FIB table 118.

The programming of IP route entries into the FIB table 118 can be performed by routing engines in network devices, such as routers. A routing engine can run either a static or dynamic routing protocol to determine routes to use for reaching various destination IP addresses.

In other examples, other forms of the rule information 122 can be used to associate destination IP addresses (or more generally destination network addresses) to IP routes (or more generally network routes).

Figure 2:
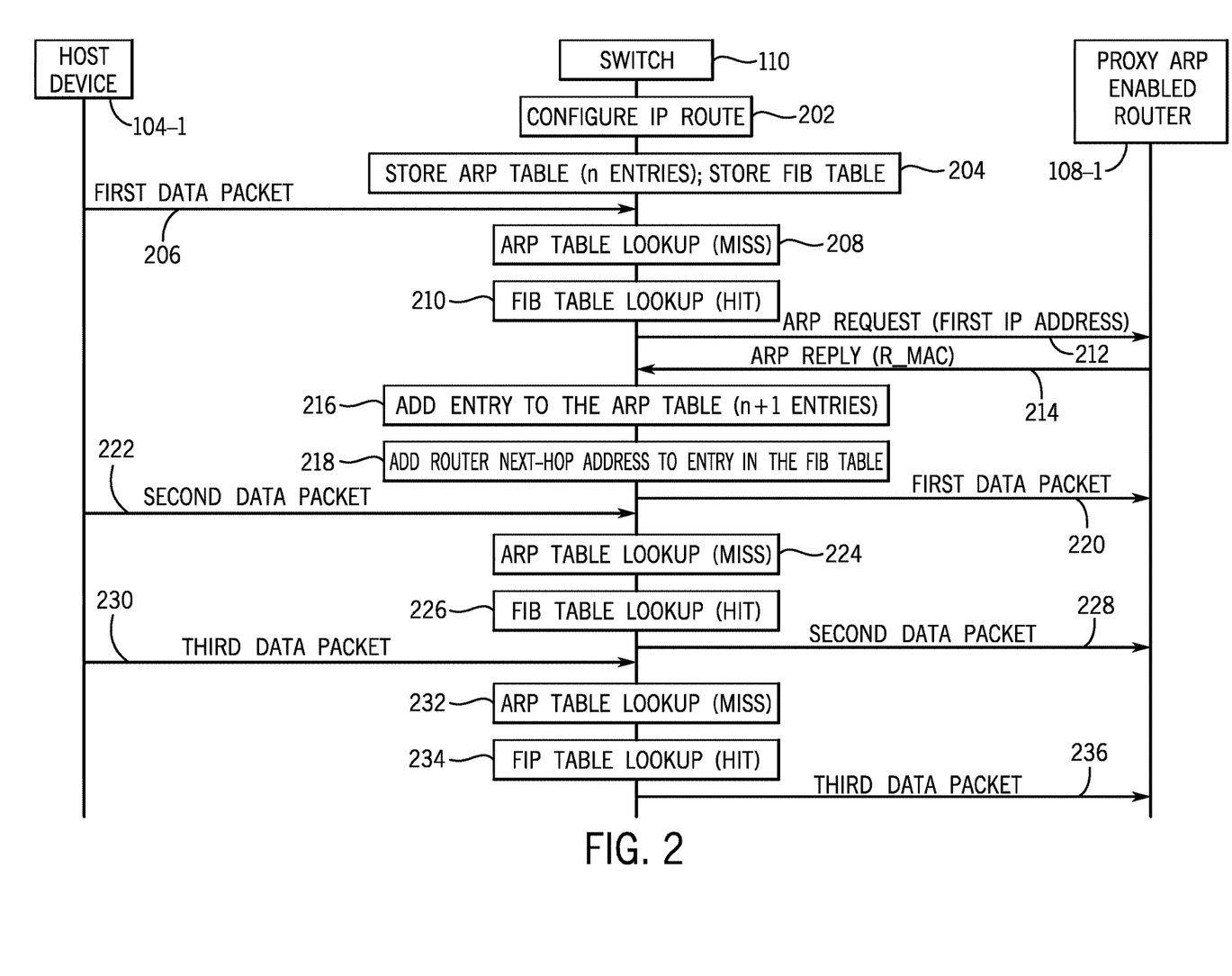
FIG. 2 is a message flow diagram of tasks performed by a host device, a switch, and an ARP proxy device, according to some examples.

FIG. 2 is a message flow diagram illustrating tasks of a host device 104-1 (which is one of the host devices 104 shown in FIG. 1), the switch 110, and the proxy ARP enabled router 108-1 (or more generally, an ARP proxy device). Although FIG. 2 shows tasks in a particular order, it is noted that in other examples, the tasks can be performed in a different order. Alternatively, some tasks can be omitted, or additional or replacement tasks can be included. In FIG. 2, at least some of the tasks of the switch 110 can be performed by the ARP next-hop routing engine 112 of FIG. 1.

As depicted in FIG. 2, an IP route having an IP route address (e.g., 20.0.0.0/10) is configured (at 202) at the switch 110 over a path between a communication interface of the switch 110 and a corresponding communication interface of the router 108-1. In some examples, an IP route can be configured by a user (e.g., a network administrator) using a user interface displayed on a device coupled to the switch 110.

The switch 110 stores (at 204) the ARP table 114, which at this time includes n entries, where n≥0. The switch 110 also stores the FIB table 118, which includes an entry corresponding to the configured IP route address.

The host device 104-1 sends (at 206) a first data packet targeted to a first IP address (e.g., 100.1.1.2) on the second network 106.

In response to the first data packet from the host device 104-1, the switch 110 performs (at 210) an ARP table lookup to determine whether the ARP table 114 contains an entry for the first IP address (e.g., 100.1.1.2). Based on a determination that there is an entry, the MAC address corresponding to the first IP address is retrieved from the ARP table 114, and the switch 110 can forward the first data packet to the retrieved MAC address.

However, for purposes of the example of FIG. 2, it is assumed that the ARP table 114 does not contain an entry for the first IP address, which results in a miss in the lookup of the ARP table 114.

The switch 110 further performs (at 210) an FIB table lookup, to determine whether the FIB table 118 contains an entry for the configured IP route (having the IP route address 20.0.0.0/10 in the example of FIG. 2). If the FIB table entry for the configured IP route includes a next-hop address, the switch 110 can use the next-hop address in the FIB lookup table entry corresponding to the configured IP route for sending the first data packet, which in this case would be sent to the router 108-1.

However, for purposes of the example of FIG. 2, although the lookup of the FIB table 118 results in a hit, it is assumed that the FIB table entry for the configured IP route does not include a next-hop address. As a result of the lookup miss of the ARP table 114 and the FIB table entry for the configured IP route not including a next-hop address, the switch 110 sends (at 212) an ARP request to seek the MAC address corresponding to the first IP address (e.g., 100.1.1.2). Note that the ARP request can be encapsulated in an IP packet that is broadcast by the switch 110 to multiple recipients, one of which is the router 108-1.

The proxy ARP engine 109 (FIG. 1) in the router 108-1 can respond to the ARP request by sending (at 214) an ARP Reply, where the ARP Reply includes the MAC address ("R_MAC") of the router 108-1. Note that the ARP Reply can be encapsulated in an IP packet that has a source IP address (e.g., R_IP_ADDR assigned to the router 108-1) and a destination IP address (assigned to the switch 110).

In response to receiving the ARP Reply, the ARP proxy next-hop routing engine 112 (FIG. 1) adds (at 216) an entry to the ARP table 114, where the added entry maps the first IP address (e.g., 100.1.1.2) of the first data packet to the MAC address of the router 108-1 (e.g., R_MAC):

Added ARP Table Entry: First IP Address↔R_MAC.

Also, in response to receiving the ARP Reply, the ARP proxy next-hop routing engine 112 adds (at 218), to the entry in the FIB table 118 corresponding to the configured IP route (as configured at 202), the next-hop address of the router 108-1, to associate the configured IP route address with the next-hop IP address (e.g., R_IP_ADDR) of the router 108-1 (which is the source IP address in the IP packet that contains the ARP Reply):

Added FIB Table Entry: IP Route Address↔R_IP_ADDR.

After the update of the ARP table 114 and the FIB table 118, the ARP table has n+1 entries.

The switch 110 forwards (at 220) the first data packet to the MAC address (R_MAC) of the router 108-1.

Subsequently, the host device 104-1 or another host device sends (at 222) a second data packet to a second IP address (e.g., 101.1.1.1) on the second network 106.

In response to receiving the second data packet, the switch 110 performs an ARP table lookup (at 224) to determine whether the ARP table 114 has an entry corresponding to the second IP address. It is assumed that the second IP address is not contained in the ARP table 114, which results in a miss in the lookup of the ARP table 114.

The switch 110 determines that the second IP address is mapped by the rule information 122 (FIG. 1) to the configured IP route. The switch 110 performs (at 226) an FIB table lookup, to determine whether the FIB table 118 contains an entry that maps the configured IP route to a next-hop address. Since the FIB table 118 contains an entry for the configured IP route, the switch 110 retrieves the next-hop address from the FIB table entry, and forwards (at 228) the second data packet to the next-hop address based on the FIB table entry. The next-hop address is the IP address (R_IP_ADDR) of the router 108-1, so that the second data packet is forwarded to the router 108-1, for distribution to a destination device assigned the second IP address (e.g., 101.1.1.1).

Accordingly, even though the ARP table 114 does not contain an entry for the second IP address, the switch 110 nevertheless is able to route the second data packet to the router 108-1 based on the entry in the FIB table 118.

Subsequently, the host device 104-1 or a different host device sends (at 230) a third data packet to a third IP address (e.g., 102.1.1.1) on the second network 106. The resulting ARP table lookup (performed at 232) results in a miss. Assuming the third IP address is mapped by the rule information 122 (FIG. 1) to the configured IP route, the FIB table lookup (performed at 234) results in an identification of an entry corresponding to the configured IP route. The third data packet is forwarded (at 236) to the IP address of the router 108-1 based on the FIB table entry corresponding to the configured IP route.

In examples where there are multiple configured IP routes at the switch 110, the FIB table 118 includes multiple corresponding entries that maps these configured IP routes to corresponding next-hop address(es).

Figure 3:
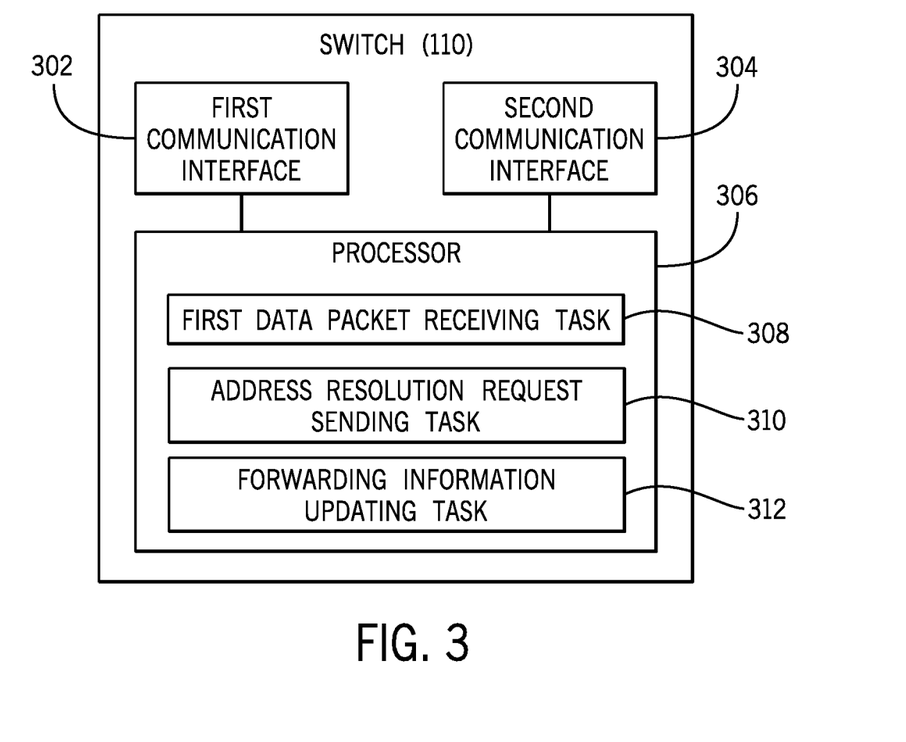
FIG. 3 is a block diagram of a switch, according to some examples.

FIG. 3 is a block diagram of the switch 110 according to further examples. The switch 110 includes a first communication interface 302 to communicate with a first device (e.g., a host device 104), and a second communication interface 304 to communicate with a proxy device enabled to perform proxy address resolution (e.g., the router 108-1). A "communication interface" can refer to a communication transceiver, which can be part of a network interface controller, for example. In some examples, a "communication interface" can further include communication protocol layers that perform data communications according to respective communication protocols (e.g., the MAC protocol, the IP protocol, a transport protocol such as the Transmission Control Protocol or User Datagram Protocol), and so forth.

The switch 110 further includes a processor 306 (or multiple processors) to perform various tasks. A processor can include a microprocessor, a core of a multi-core microprocessor, a microcontroller, a programmable integrated circuit, a programmable gate array, or another hardware processing circuit. A processor performing a task can refer to a single processor performing the task or multiple processors performing the task. Thus, in examples where the processor is a programmable integrated circuit, the processor may include hardware circuits to perform the tasks.

The various tasks of the processor 306 include a first data packet receiving task 308 to receive a first data packet from the first device targeted to a first layer 3 network address. The various tasks further include an address resolution request sending task 310 to send, to the proxy device, an address resolution request (e.g., an ARP request) to obtain a layer 2 network address corresponding to the first layer 3 network address.

The various tasks further include a forwarding information updating task 312 to, responsive to receiving a response to the address resolution request, update a forwarding information structure (e.g., the FIB table 118) to refer to a layer 3 network address of the proxy device, the forwarding information structure useable to forward a second data packet to the proxy device for transmission of the second data packet to a destination device.

Figure 4:
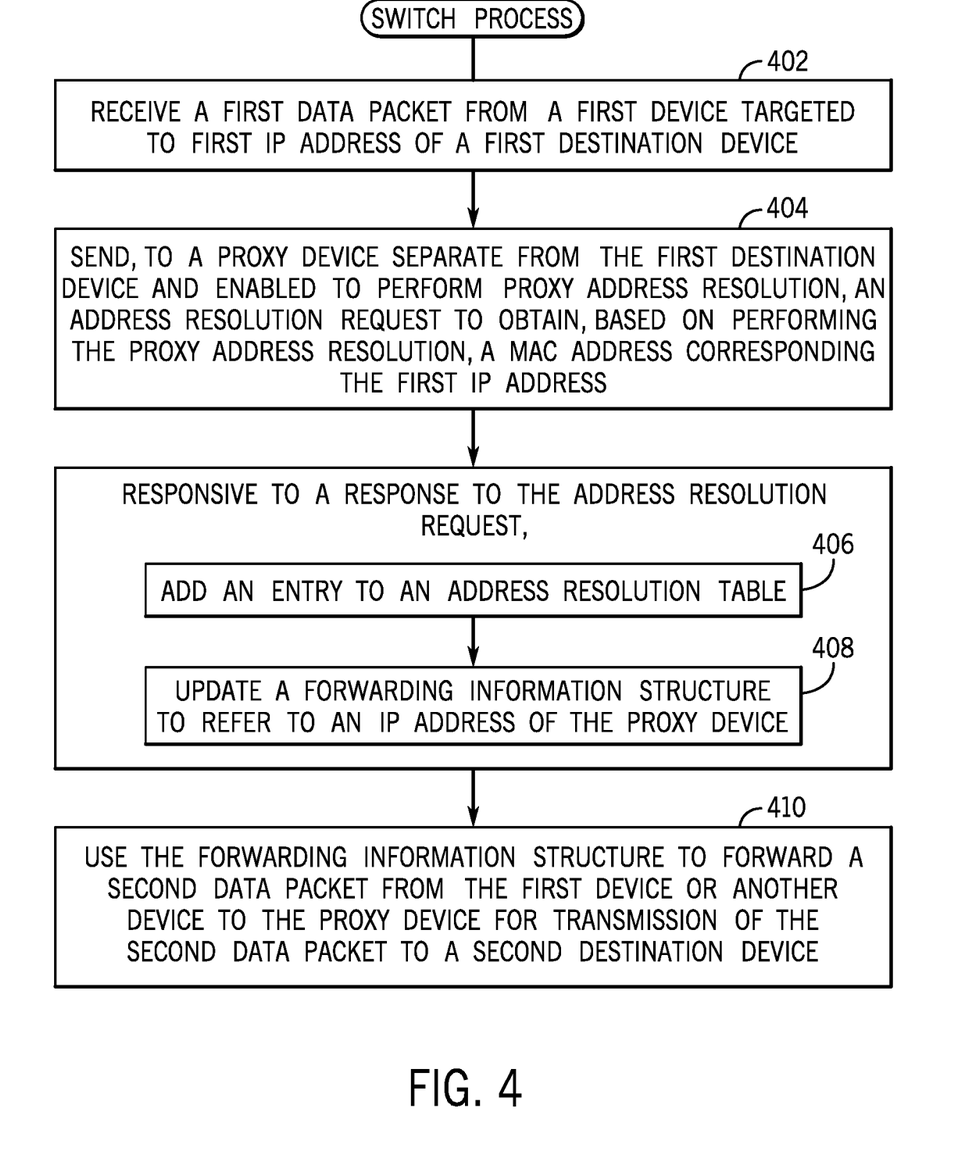
FIG. 4 is a flow diagram of a process performed by a switch, according to some examples.

FIG. 4 is a flow diagram of a process performed by the switch 110. Although FIG. 4 shows tasks in a particular order, it is noted that in other examples, the tasks can be performed in a different order. Alternatively, some tasks can be omitted, or additional or replacement tasks can be included. In FIG. 4, at least some of the tasks of the switch 110 can be performed by the ARP next-hop routing engine 112 of FIG. 1.

The switch receives (at 402) a first data packet from a first device targeted to first IP address of a first destination device. The switch 110 sends (at 404), to a proxy device separate from the first destination device and enabled to perform proxy address resolution, an address resolution request to obtain, based on performing the proxy address resolution, a MAC address corresponding to the first IP address.

Responsive to a response to the address resolution request, the switch 110 adds (at 406) an entry to an address resolution table, and updates (at 408) a forwarding information structure to refer to an IP address of the proxy device.

The switch 110 uses (at 410) the forwarding information structure to forward a second data packet from the first device or another device to the proxy device for transmission of the second data packet to a second destination device.

Figure 5:
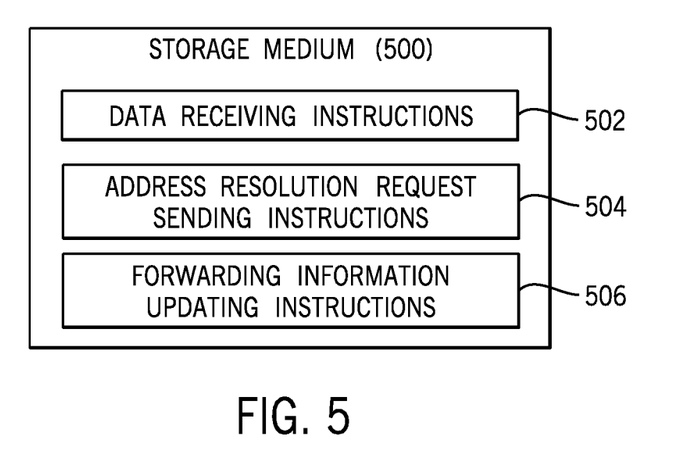
FIG. 5 is a block diagram of a storage medium storing machine-readable instructions, according to some examples.

FIG. 5 is a block diagram of a non-transitory machine-readable or computer-readable storage medium 500 storing machine-readable instructions that upon execution (by a processor) cause a switch to perform various tasks. The machine-readable instructions include data receiving instructions 502 to receive data from a first device targeted to layer 3 network address of a first destination device. The machine-readable instructions further include address resolution request sending instructions 504 to send, to a proxy device separate from the destination device and enabled to perform proxy address resolution, an address resolution request to obtain a layer 2 network address corresponding to the layer 3 network address.

The machine-readable instructions additionally include forwarding information updating instructions 506 to, responsive to receiving a response to the address resolution request from the proxy device, update a forwarding information structure to refer to a layer 3 network address of the proxy device, the forwarding information structure useable to forward subsequent data to the proxy device for transmission of the subsequent data to a second destination device.

The storage medium 500 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A switch comprising:
a first communication interface to communicate with a first device;
a second communication interface to communicate with a proxy device enabled to perform proxy address resolution; and
a processor to:
receive a first data packet from the first device targeted to a first layer 3 network address,
send, to the proxy device, an address resolution request to obtain a layer 2 network address corresponding to the first layer 3 network address, and
responsive to receiving a response to the address resolution request, add an entry in a forwarding information structure, wherein the added entry in the forwarding information structure associates a predetermined route to a layer 3 network address of the proxy device, wherein the added entry in the forwarding information structure is useable to forward a second data packet to the proxy device for transmission of the second data packet to a destination device, wherein a second layer 3 network address targeted by the second data packet is different from the first layer 3 network address targeted by the first data packet, and wherein the processor is configured to forward the second data packet without sending an address resolution request to obtain a layer 2 network address corresponding to the second layer 3 network address.

2. The switch of claim 1, wherein the processor is to:
for a plurality of layer 3 network addresses of destination devices separate from the proxy device, maintain an address resolution information entry mapping a layer 3 network address of the plurality of layer 3 network addresses to a layer 2 network address of the proxy device received by the switch, and
use the forwarding information structure to forward, to the proxy device, data packets targeted to the plurality of layer 3 network addresses.

3. The switch of claim 2, wherein the processor is to:
add the address resolution information entry responsive to information in the response to the address resolution request.

4. The switch of claim 2, further comprising a ternary content-addressable memory to store the address resolution information entry.

5. The switch of claim 2, wherein the address resolution request comprises an Address Resolution Protocol (ARP) request,
wherein the proxy address resolution comprises a proxy ARP operation to respond to the ARP request with the layer 2 network address of the proxy device, and
wherein the address resolution information entry comprises an entry of an ARP table.

6. The switch of claim 2, wherein the first device is on a first network, the destination devices are on a second network, and the proxy device is at a border between the first and second networks.

7. The switch of claim 1, wherein the forwarding information structure comprises a Forwarding Information Base (FIB) table that correlates an Internet Protocol (IP) route to a next-hop address comprising the layer 3 network address of the proxy device.

8. The switch of claim 7,
wherein the processor is to map the first and second layer 3 network addresses to the IP route using rule information.

9. The switch of claim 8, wherein the IP route is a first IP route, and wherein the processor is to:
receive a further data packet from a device targeted to a third layer 3 network address,
map the third layer 3 network address to a second IP route using the rule information,
send, to a second proxy device enabled to perform proxy address resolution, a second address resolution request to obtain a layer 2 network address corresponding to the third layer 3 network address, and
responsive to receiving a response to the second address resolution request, update the FIB table to add another entry that refers to a layer 3 network address of the second proxy device.

10. The switch of claim 1, wherein a respective layer 3 network address comprises an Internet Protocol (IP) address.

11. The switch of claim 1, wherein a respective layer 2 network address comprises a Medium Access Control (MAC) address.

12. A non-transitory machine-readable storage medium storing instructions that upon execution cause a switch to:
receive data from a first device targeted to layer 3 network address of a first destination device;
send, to a proxy device separate from the destination device and enabled to perform proxy address resolution, an address resolution request to obtain a layer 2 network address corresponding to the layer 3 network address; and
responsive to receiving a response to the address resolution request from the proxy device, add an entry in a forwarding information structure, wherein the added entry in the forwarding information structure associates a predetermined route to a layer 3 network address of the proxy device, wherein the added entry in the forwarding information structure is useable to forward subsequent data to the proxy device for transmission of the subsequent data to a second destination device, wherein a second layer 3 network address targeted by the second data packet is different from the first layer 3 network address targeted by the first data packet, and wherein the switch is further configured to forward the second data packet without sending an address resolution request to obtain a layer 2 network address corresponding to the second layer 3 network address.

13. The non-transitory machine-readable storage medium of claim 12, wherein first device is on a first network, the first and second destination devices are on a second network, and the proxy device is at a border between the first and second networks.

14. The non-transitory machine-readable storage medium of claim 13, wherein the instructions upon execution cause the switch to:
add, responsive to the response to the address resolution request, an entry to an address resolution table, the entry mapping the layer 3 network address of the first destination device to the layer 2 network address of the proxy device,
wherein not sending the address resolution request for the second layer 3 network address avoids adding an entry to the address resolution table for the second layer 3 network address.

15. The non-transitory machine-readable storage medium of claim 14, wherein the address resolution table comprises an Address Resolution Protocol (ARP) table.

16. The non-transitory machine-readable storage medium of claim 12, wherein the forwarding information structure comprises a Forwarding Information Base (FIB) table that correlates an Internet Protocol (IP) route to a next-hop address comprising the layer 3 network address of the proxy device.

17. A method comprising:
receiving, by a switch, a first data packet from a first device targeted to first Internet Protocol (IP) address of a first destination device;
sending, by the switch to a proxy device separate from the first destination device and enabled to perform proxy address resolution, an address resolution request to obtain, based on performing the proxy address resolution, a Medium Access Control (MAC) address corresponding to the first IP address;
responsive to a response to the address resolution request:
adding, by the switch, an entry to an address resolution table, and
adding an entry in a forwarding information structure, wherein the added entry in the forwarding information structure associates a predetermined route to an IP address of the proxy device; and
using the forwarding information structure to forward a second data packet from the first device or another device to the proxy device for transmission of the second data packet to a second destination device, wherein a second IP address targeted by the second data packet is different from the first IP address targeted by the first data packet, and wherein switch is configured to forward the second data packet without sending an address resolution request to obtain a MAC address corresponding to the second IP address.

18. The method of claim 17, wherein the forwarding of the second data packet to the proxy device is performed without an entry in the address resolution table for the second IP address to which the second data packet is targeted.

* * * * *